US008542887B2

(12) United States Patent
Nakano et al.

(10) Patent No.: US 8,542,887 B2
(45) Date of Patent: Sep. 24, 2013

(54) OBJECT IDENTIFICATION APPARATUS AND OBJECT IDENTIFICATION METHOD

(75) Inventors: Shunsuke Nakano, Kawasaki (JP); Hiroshi Sato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 284 days.

(21) Appl. No.: 12/908,480

(22) Filed: Oct. 20, 2010

(65) Prior Publication Data

US 2011/0103694 A1    May 5, 2011

(30) Foreign Application Priority Data

Oct. 30, 2009  (JP) ................................. 2009-251357

(51) Int. Cl.
*G06K 9/00* (2006.01)
*G06K 9/46* (2006.01)
*G06K 9/62* (2006.01)

(52) U.S. Cl.
USPC ........................... 382/118; 382/190; 382/224

(58) Field of Classification Search
USPC ................................................ 382/118, 190
See application file for complete search history.

(56) References Cited

U.S. PATENT DOCUMENTS

| 5,751,959 | A  | 5/1998  | Sato et al. |
| 5,819,048 | A  | 10/1998 | Okazaki et al. |
| 5,909,543 | A  | 6/1999  | Tanaka et al. |
| 6,463,176 | B1 | 10/2002 | Matsugu et al. |
| 6,704,042 | B2 | 3/2004  | Matsui et al. |
| 7,054,850 | B2 | 5/2006  | Matsugu |
| 7,532,745 | B2 | 5/2009  | Inoue |
| 7,639,282 | B2 | 12/2009 | Kaneda et al. |
| 2003/0161504 | A1 | 8/2003 | Inoue |
| 2005/0084155 | A1* | 4/2005 | Yumoto et al. ................ 382/190 |
| 2005/0117783 | A1* | 6/2005 | Sung et al. .................... 382/118 |
| 2006/0204103 | A1* | 9/2006 | Mita et al. ..................... 382/190 |
| 2007/0050639 | A1* | 3/2007 | Nakano et al. ................ 713/186 |
| 2008/0247611 | A1* | 10/2008 | Aisaka et al. ................. 382/118 |
| 2008/0298643 | A1* | 12/2008 | Lawther et al. ............... 382/118 |

(Continued)

FOREIGN PATENT DOCUMENTS

| JP | 3078166 | 6/2000 |
| JP | 2002-008032 | 1/2002 |

(Continued)

OTHER PUBLICATIONS

Kwon, Young Ho, et al, Age classification from facial images, Jun. 1994, Proceedings of 1994 IEEE Computer Society Conference on Computer Vision and Pattern Recognition, pp. 1-6.*

(Continued)

*Primary Examiner* — Utpal Shah
(74) *Attorney, Agent, or Firm* — Fitzpatrick, Cella, Harper & Scinto

(57) ABSTRACT

An object identification apparatus which identifies an object included in an input image includes a unit which calculates correlation values of feature amounts in standard partial feature regions respectively extracted from the input images and processing targets, and correlation values of feature amounts in adaptive partial feature regions respectively extracted from the input image and processing targets, a unit which calculates similarities based on the calculated correlation values, and a unit which integrates the plurality of calculated similarities, and outputs them as an integrated similarity between the input image and registered image as the processing targets. According to the object identification apparatus, an identification performance between two specific categories, which are similarity to each other, is improved while maintain an overall identification performance.

11 Claims, 13 Drawing Sheets

(56) References Cited

U.S. PATENT DOCUMENTS

| | | |
|---|---|---|
| 2009/0003709 A1 | 1/2009 | Kaneda et al. |
| 2009/0190834 A1 | 7/2009 | Inoue |
| 2010/0103286 A1* | 4/2010 | Akiyama ............... 348/231.6 |
| 2011/0103694 A1* | 5/2011 | Nakano et al. ............ 382/190 |

FOREIGN PATENT DOCUMENTS

| | | |
|---|---|---|
| JP | 2003-323622 | 11/2003 |
| JP | 2007-114931 A | 5/2007 |
| JP | 2008-257425 A | 10/2008 |

OTHER PUBLICATIONS

Brunelli, R., et al, Face Recognition: Features versus Templates, 1993, IEEE Transactions on PAMI, vol. 15, pp. 1-12.*

Jain, A. K., et al, Data Clustering: A Review, Sep. 1999, ACM Computing Surveys, vol. 31, pp. 1-60.*

Shen, L., Bai, L., Bardsley, D., and Wang, Y., "Gabor feature selection for face recognition using improved adaboost learning," Proceedings of International Workshop on Biometric Recognition System, ICCV '05, 2005.

Glenn Fung and O.L. Mangasarian, "Incremental support vector machine classification," Proceedings of Second SIAM International Conference on Data Mining, 2002, pp. 1-11.

T. Ahonen, A. Hadid, & M. Pietikäinen (2004), "Face recognition with local binary patterns", Proc. of 8th European Conference on Computer Vision, ser. Lecture Notes in Computer Science, vol. 3021, pp. 469-481.

Viola & Jones (2001) "Rapid Object Detection using a Boosted Cascade of Simple Features", Computer Vision and Pattern Recognition, pp. 1-9.

* cited by examiner

☐ : STANDARD PARTIAL FEATURE REGION
⋯ : ADAPTIVE PARTIAL FEATURE REGION

F I G. 10
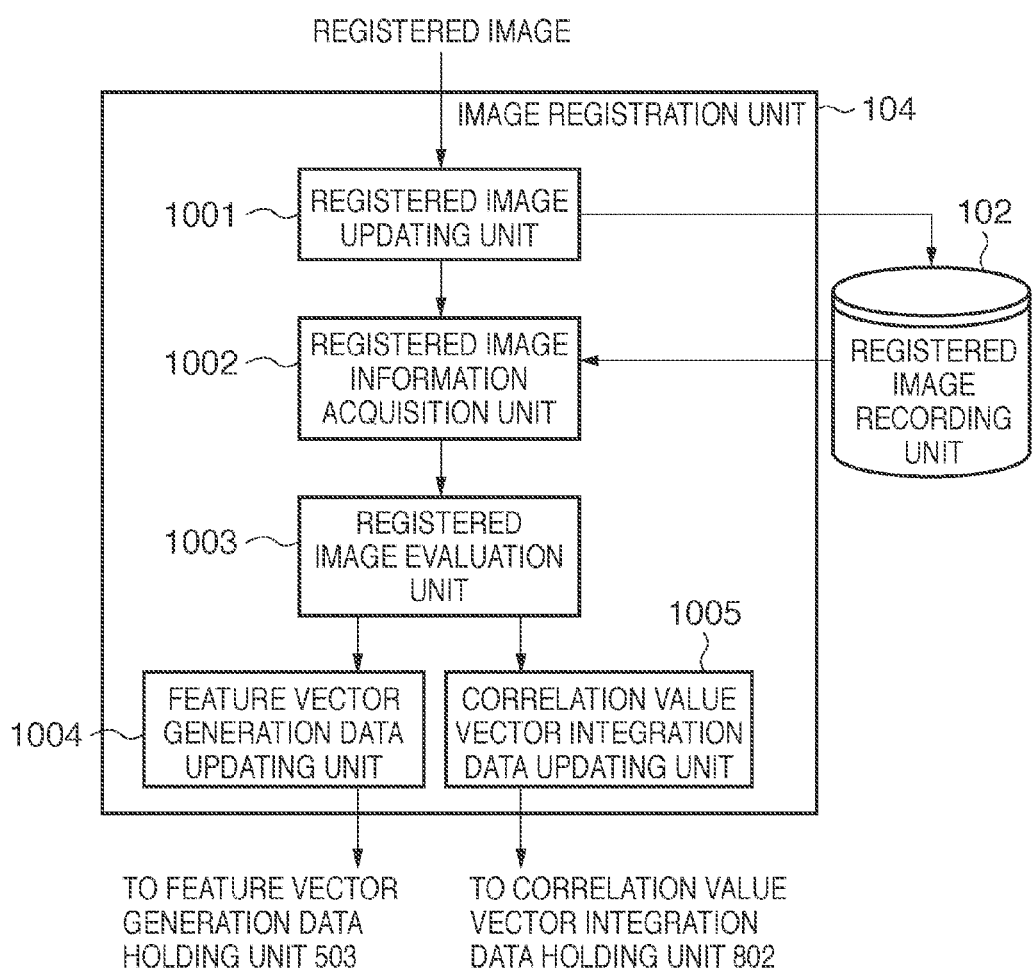

OBJECT IDENTIFICATION APPARATUS AND OBJECT IDENTIFICATION METHOD

BACKGROUND OF THE INVENTION

1. Field of the Invention

The present invention relates to an object identification technique for identifying an object included in an input image.

2. Description of the Related Art

An object identification technique which identifies to which of categories specified by objects included in a plurality of images, which are registered in advance (registered images), an object included in an input image belongs by comparing the input image with the registered images is known. As an application field of the object identification technique, for example, a face object identification technique for specifying a person from a face object included in an input image is known.

In the face object identification technique, categories include names and IDs required to specify persons, and registered images are a plurality of face images (images including face objects) assigned names and IDs. In face object identification processing, registered images including images of the same person even under different photographing conditions have to be classified into a single category.

Note that "identification of an object" of terms used in this specification means determining difference between individuals (for example, a of a different of a person) included in an input image (that is, identification of a category to which an object belongs). "Detection of an object" means determination of objects which belong to a single category without discriminating individuals in association with objects included in an input image (for example, detection of face objects without specifying persons).

In the field of the object identification technique, a method of executing identification processing using feature amounts (partial feature amounts) in feature regions (partial feature regions) of a face object included in an image is generally known (for example, see Japanese Patent Laid-Open No. 2003-323622).

In this method, partial feature amounts are extracted in advance from some partial feature regions in registered images. When an input image to be identified is input, partial feature amounts are extracted from the partial feature regions in the input image, which correspond to those in the registered images. Then, scores obtained by comparing the partial feature amounts between the input image and registered images are integrated to calculate similarities between the input image and registered images. Furthermore, these processes are executed for respective categories, and the input image is classified into a category for which the highest similarity is finally calculated.

In case of the method of classifying an input image by identifying an object included in the input image using partial feature amounts in partial feature regions, the influences of photographing conditions can be effectively eliminated, thus improving an identification performance.

Note that partial feature regions used upon extracting partial feature amounts in such identification processing can be calculated in advance using a machine learning method such as an AdaBoost method disclosed in, for example, Shen, L., Bai, L., Bardsley, D., and Wang, Y., "Gabor feature selection for face recognition using improved adaboost learning." (Proceedings of International Workshop on Biometric Recognition System, in conjunction with ICCV '05, 2005). Furthermore, as a technique suited to such prior learning, for example, a sequential learning method which improves an identification performance by sequentially adding learning data during operation of identification processing is prevalent (for example, see Glenn Fung and O. L. Mangasarian, "Incremental support vector machine classification" (Proceedings of Second SIAM International Conference on Data Mining, 2002)).

In the field of the face object identification technique, it is important to cover variations of the appearance of a face object due to different photographing conditions, as described above, and also to attain accurate identification by adequately judging even small differences between similar categories.

More specifically, upon identification of a face object, it is indispensable to be free from the influences of photographing condition changes such as face directions, face expressions, and illumination states independently of races, ages, and genders. In addition, it is important to adequately identify a face object between very similar face objects such as a parent and child, and brothers.

However, when the method disclosed in the prior art reference is applied, although the influences of the photographing conditions can be eliminated, a sufficient identification performance cannot be obtained for two categories having very small differences (for example, for categories of twins). This is because the aforementioned method is configured for the purpose of improving the identification performance of a plurality of categories as a whole, but it is not configured in recognizing improvement of an identification performance between two specific categories.

On the other hand, in case of identification of a face object, it is important to adequately identify a face object between very similar face objects. That is, in face object identification, it is desirable to obtain a sufficient identification performance even for two categories having very small mutual differences while keeping high robustness against photographing condition changes.

SUMMARY OF THE INVENTION

The present invention has been made in consideration of the aforementioned problems.

An object identification apparatus according to the present invention comprises the following arrangement. That is an object identification apparatus for classifying an input image by identifying an object included in the input image, comprising: a recording unit configured to record a plurality of registered images which are classified into a plurality of categories based on attribute of objects included in respective registered images; a first extraction unit configured to extract, as standard partial feature regions, predetermined regions in objects, wherein the predetermined regions are used to extract feature amounts required to classify a plurality of images including the objects into the plurality of categories; a second extraction unit configured to extract, as adaptive partial feature regions, predetermined regions in the objects in images, wherein the predetermined regions are used to extract feature amounts required to classify the images belonging to any one of two specified categories among the plurality of categories into one of the two specified categories; a correlation value calculation unit configured to respectively calculate first correlation values which represent correlations between feature amounts in the standard partial feature regions extracted from the input image, and feature amounts in the standard partial feature regions extracted from the registered images to be processed using the first extraction unit, and second correlation values which represent correlations between feature amounts in the adaptive partial feature regions extracted from the input image and feature amounts in the adaptive partial feature regions extracted from the registered images to be processed using the second extraction unit; a similarity calculation unit configured to calculate similarities between objects included in the registered images to be processed and an object included in the input image based on the first correlation values and the second correlation values calculated by the correlation value calculation unit in correspondence with respective categories except for the category to which the registered images to be processed are classified; and an output unit configured to output an integrated similarity between the input image and the registered images to be processed by integrating a plurality of similarities calculated by the similarity calculation unit.

According to the present invention, in an object identification apparatus which identifies an object included in an input image, and classifies the object into one of a plurality of categories, an identification performance between two specific categories which are similar to each other can be improved while maintaining high overall identification performance.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 10 is a block diagram showing the functional arrangement of an image registration unit;

DESCRIPTION OF THE EMBODIMENTS

Embodiments of the present invention will now be described in detail in accordance with the accompanying drawings.

[First Embodiment]

<1. Overall Arrangement of Object Identification Apparatus>

Figure 1:
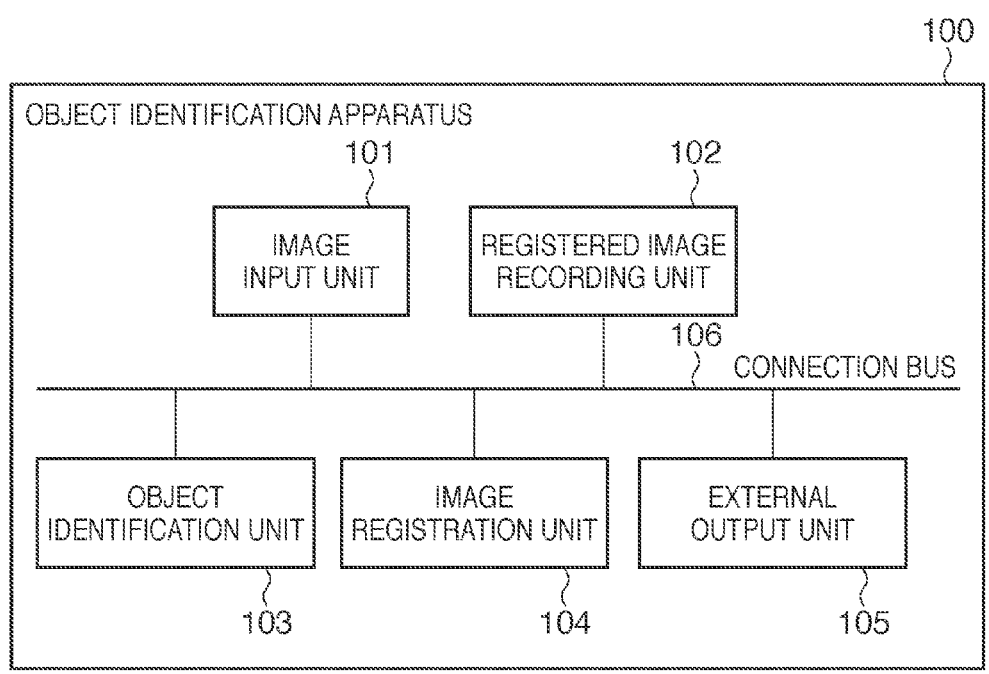
FIG. 1 is a block diagram showing the overall arrangement of an object identification apparatus according to the first embodiment of the present invention.

FIG. 1 is a block diagram showing the overall arrangement of an object identification apparatus 100 according to the first embodiment of the present invention. As shown in FIG. 1, the object identification apparatus 100 includes an image input unit 101, registered image recording unit 102, object identification unit 103, image registration unit 104, and external output unit 105, which are connected via a connection bus 106 to be able to communicate with each other.

The image input unit 101 inputs image data to be classified (input image). The image input unit 101 includes an image capturing device including an optical lens and video sensor, and a semiconductor memory which holds image data to be able to be read out.

The registered image recording unit 102 records and holds predetermined images (those which are assigned names and IDs after persons are specified) of the input images input by the image input unit 101 as registered images. Assume that the registered images are classified into corresponding categories and are held, so that objects that represent a single attribute (person) define a single category.

The registered image recording unit 102 is typically a repetitively rewritable semiconductor memory, and desirably has a capacity capable of holding ten or more registered images. However, the registered image recording unit 102 may have a small capacity when an arrangement that holds only registered images to be processed upon execution of object identification processing by the object identification unit 103 is adopted.

The object identification unit 103 identifies an object included in the input image based on the input image input by the image input unit 101 and the registered images held in the registered image recording unit 102. Note that details of the processing in the object identification unit 103 will be described later.

The image registration unit 104 executes processing for recording a registered image in the registered image recording unit 102 and that for deleting a registered image already held in the registered image recording unit 102. Note that details of the processing in the registered image recording unit 102 will be described later.

Note that the object identification unit 103 and image registration unit 104 are configured by, for example, a dedicated circuit (ASIC) or processor (reconfigurable processor, DSP, CPU, etc.). Alternatively, the object identification unit 103 and image registration unit 104 are configured so that programs are executable in a single dedicated circuit and general-purpose circuit (a CPU for a PC).

The external output unit 105 externally outputs the input image input by the image input unit 101 in a predetermined output mode. Alternatively, the external output unit 105 externally outputs a category to which the input image is classified, as a classification result of the object identification unit 103, in a predetermined output mode. Note that both the input image and classification result may be output in a superimposed manner.

The external output unit 105 includes, for example, an arbitrary device such as a CRT or TFT liquid crystal monitor, which makes a display output. However, the output mode is not limited to this. For example, other output modes such as a data output to an external storage medium and a print output to a paper medium may be used.

<2. Sequence of Overall Processing in Object Identification Apparatus>

Figure 2:
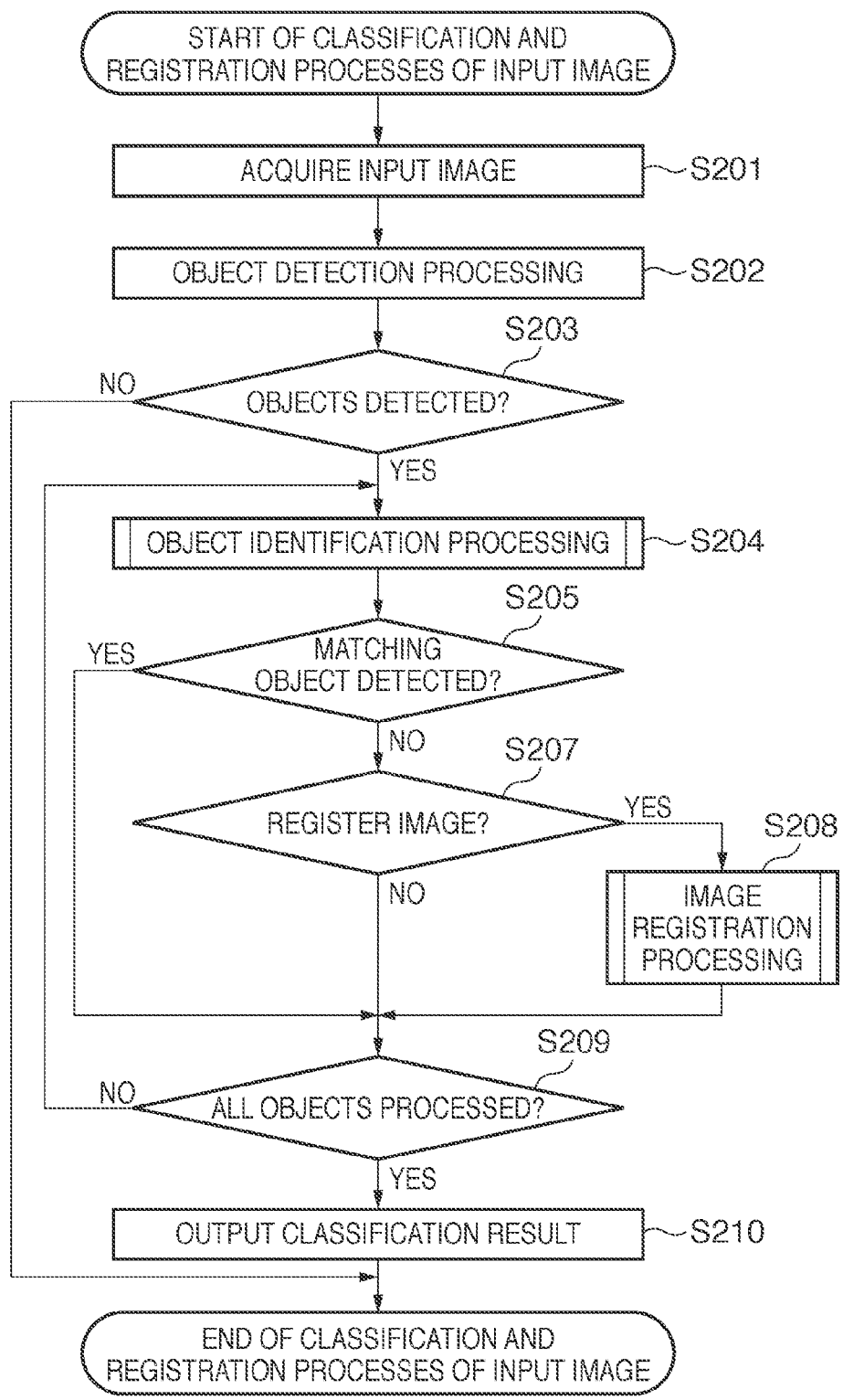
FIG. 2 is a flowchart showing the sequence of classification and registration processes of an input image in the object identification apparatus according to the first embodiment of the present invention.

FIG. 2 is a flowchart showing the sequence of classification and registration processes of an input image executed by the object identification apparatus 100. The sequence of classification and registration processes of an input image executed by the object identification apparatus 100 will be described below with reference to FIG. 2. Note that a case will be described below wherein an object included in an input image to be identified is a face object. However, an object included in an input image to be identified is not limited to a face object.

In step S201, the image input unit 101 acquires an input image to be classified. In step S202, the object identification unit 103 applies object detection processing to the acquired input image. Assume that detection of face objects from the input image uses a known technique. More specifically, assume that a method disclosed in Japanese Patent No. 3078166 or Japanese Patent Laid-Open No. 2002-8032 is used.

Upon completion of the object detection processing, the process advances to step S203, and the object identification unit 103 determines whether or not the input image to be classified includes objects. If the object identification unit 103 determines that the input image includes objects, the process advances to step S204, and it executes object identification processing; otherwise, the processing ends.

The image registration unit 104 checks in step S205 whether or not the input image to be classified is classified into one of categories, and a person represented by an object included in the input image can be specified by the object identification processing. That is, the image registration unit 104 checks if a category, to which registered images including a face object identified as the same person as that represented by a face object included in the input image are classified, is held, and a name and ID (attributes) required to specify the person are registered in the category.

If the image registration unit 104 determines in step S205 that the input image is classified into one of categories, and a person represented by an object included in the input image can be specified, the process jumps to step S209. On the other hand, if the image registration unit 104 determines that the input image is not classified to any category, or a person represented by an object included in the input image cannot be specified, the process advances to step S207. In step S207, the image registration unit 104 inquires the user as to whether or not the input image is recorded in the registered image recording unit 102 as a registered image.

As a result of inquiry, if the user inputs an instruction to record the input image in the registered image recording unit 102 as a registered image, the process advances to step S208. On the other hand, if the user does not input any instruction to record the input image in the registered image recording unit 102 as a registered image, the process advances to step S209. However, the inquiry processing to the user in step S207 need not always be executed, and the input image may be automatically recorded in the registered image recording unit 102 as a registered image.

In step S208, the image registration unit 104 executes image registration processing. The object identification unit 103 checks in step S209 whether or not the processes in steps S204 to S208 are complete for all objects detected from the input image to be classified in step S202. If the object identification unit 103 determines in step S209 that objects to be processed still remain, the process returns to step S204. On the other hand, if the object identification unit 103 determines that the processes in steps S204 to S208 are complete for all the objects, the process advances to step S210.

In step S210, the external output unit 105 outputs a classification result in the object identification unit 103.

Note that in the image registration processing (step S208), when the input image includes a large number of non-registered objects, the user operations may become complicated. For this reason, when the input image includes a large number of non-registered objects, the image registration unit 104 may execute the image registration processing only for several objects having larger sizes of these objects.

In the above description, the image registration processing is executed only when it is determined that the input image includes a non-registered object. However, the present invention is not limited to this. For example, the image registration processing may be executed independently of the object identification processing in the object identification unit 103. Furthermore, in the above description, the image registration unit 104 executes the image registration processing. However, the present invention is not limited to this. For example, the user may directly record an image in the registered image recording unit 102 via the image input unit 101.

<3. Object Identification Unit>

<3.1 Functional Arrangement and Processing Sequence of Object Identification Unit>

The functional arrangement of the object identification unit 103 and the sequence of the object identification processing executed by the object identification unit 103 will be described below.

Figure 3:
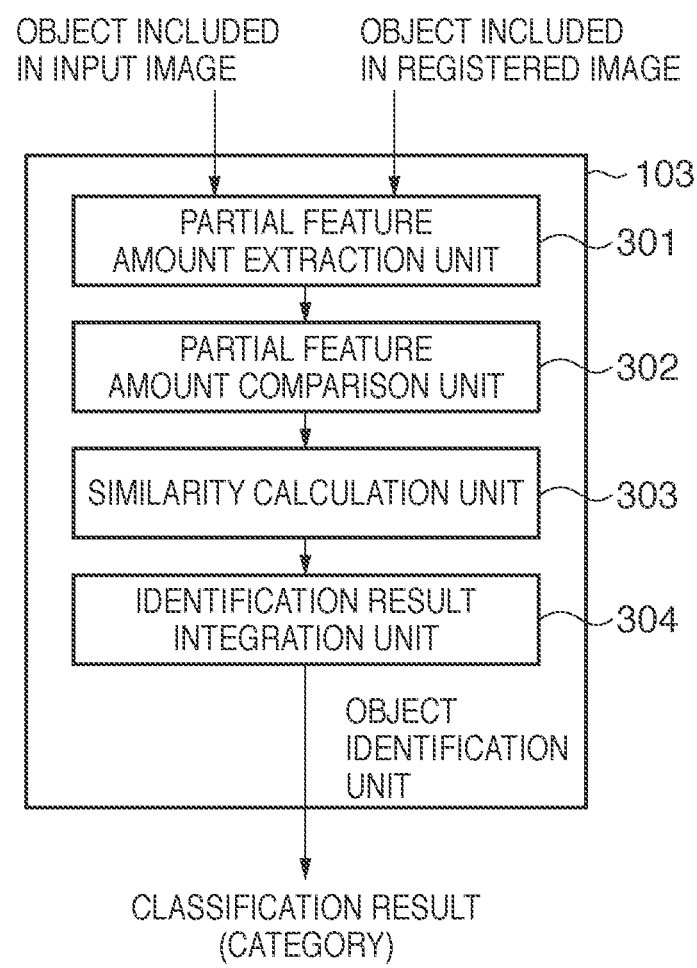
FIG. 3 is a block diagram showing the functional arrangement of an object identification unit.

FIG. 3 is a block diagram showing the functional arrangement of the object identification unit 103. As shown in FIG. 3, the object identification unit 103 includes a partial feature amount extraction unit 301, partial feature amount comparison unit 302, similarity calculation unit 303, and identification result integration unit 304.

The partial feature amount extraction unit 301 applies the same processing to an object included in the input image acquired from the image input unit 101 and those included in the registered images acquired from the registered image recording unit 102. More specifically, the partial feature amount extraction unit 301 extracts partial feature amounts required to identify the object included in the input image respectively from the objects included in the input image and registered images.

The partial feature amount comparison unit 302 compares the partial feature amounts respectively extracted from the objects included in the input image and registered images by the partial feature amount extraction unit 301, and calculates correlation values for respective partial feature amounts between the objects included in the input image and registered images. That is, the partial feature amount comparison unit 302 serves as correlation value calculation means.

The similarity calculation unit 303 calculates similarities by integrating the correlation values for respective partial feature amounts calculated by the partial feature amount comparison unit 302, and also calculates an integrated similarity used to judge which of categories to which the registered images are classified the input image is classified.

The identification result integration unit 304 finally judges a category to which the input image is to be classified from the similarities calculated between the registered images classified into respective categories and the input image, and outputs a classification result.

Figure 4:
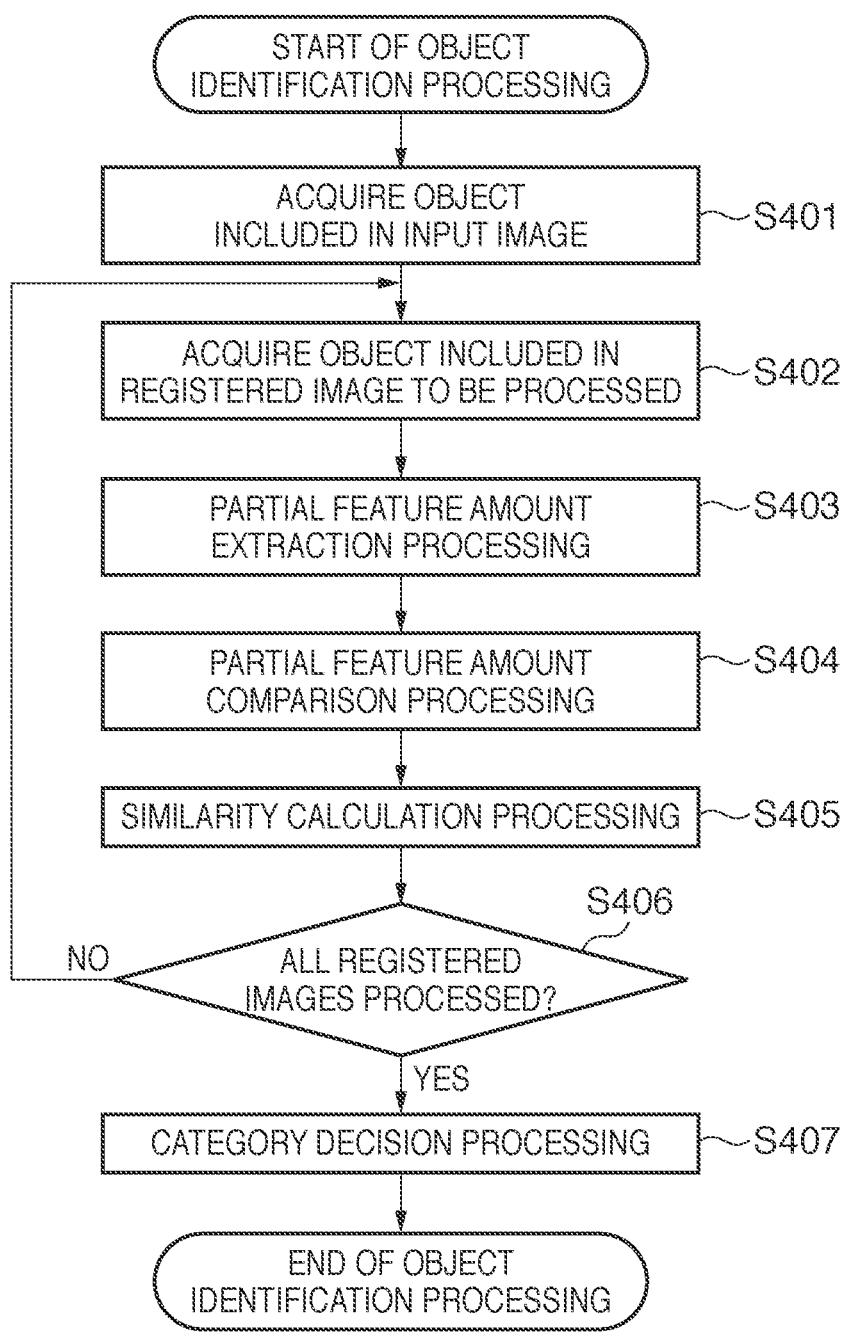
FIG. 4 is a flowchart showing the sequence of object identification processing by the object identification unit.

FIG. 4 is a flowchart showing the sequence of detailed processing of the object identification processing executed by the object identification unit 103 in step S204 in FIG. 2.

In step S401, an object included in the input image to be classified acquired from the image input unit 101 is acquired. In step S402, an object included in a registered image to be processed of the registered images acquired from the registered image recording unit 102 is acquired.

In step S403, the partial feature amount extraction unit 301 applies partial feature amount extraction processing to the acquired object included in the input image. Also, the partial feature amount extraction unit 301 applies partial feature amount extraction processing to the acquired object included in the registered image.

In step S404, the partial feature amount comparison unit 302 compares partial feature amounts extracted from the object included in the registered image to be processed, and those extracted from the object included in the input image, and calculates correlation values for respective feature amounts.

In step S405, the similarity calculation unit 303 executes similarity calculation processing based on the correlation values calculated in step S404 to calculate an integrated similarity between the input image and registered image.

The identification result integration unit 304 checks in step S406 whether or not the processes in steps S402 to S405 are complete for all registered images acquired from the registered image recording unit 102. If the identification result integration unit 304 determines in step S406 that the processes are not complete yet, the process returns to step S402; otherwise, the process advances to step S407.

In step S407, the identification result integration unit 304 classifies the input image to be classified into a category to which the registered image, for which maximum one of the integrated similarities calculated for respective registered images in step S405 is calculated, is classified. Furthermore, the identification result integration unit 304 outputs the classification result to the external output unit 105 as that in the object identification processing.

Assume that the classification result includes the registered image for which the maximum integrated similarity is calculated, and that similarity value. However, the present invention is not limited to this. For example, the classification result may further include an identifier indicating a category to which the registered image, for which the maximum integrated similarity is calculated, is classified. When there are a plurality of registered images for which the maximum integrated similarity is calculated, the classification result may include all these registered images.

<3.2 Processing Sequence in Partial Feature Amount Extraction Unit>

Figure 5:
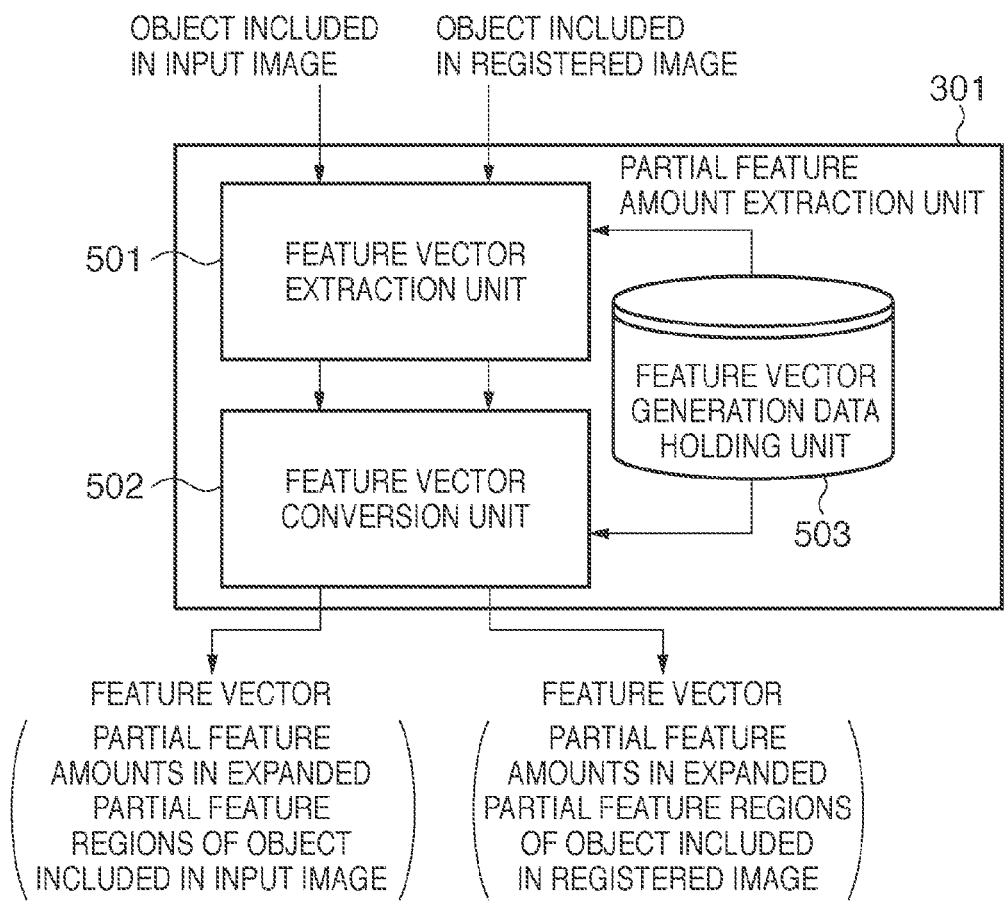
FIG. 5 is a block diagram showing the functional arrangement of a partial feature amount extraction unit.

The processes of the respective units which configure the object identification unit 103 will be described below. Details of the processing in the partial feature amount extraction unit 301 will be described first. FIG. 5 is a block diagram showing the functional arrangement of the partial feature amount extraction unit 301. As shown in FIG. 5, the partial feature amount extraction unit 301 includes a feature vector extraction unit 501, feature vector conversion unit 502, and feature vector generation data holding unit 503.

As described above, the partial feature amount extraction unit 301 applies the same processing to an object included in the input image and those included in the registered images. More specifically, the partial feature amount extraction unit 301 extracts partial feature regions from each object, and extracts partial feature amounts from the extracted partial feature regions. After that, the partial feature amount extraction unit 301 applies predetermined processing to the partial feature amounts, and then outputs the processed partial feature amounts as a feature vector. In order to speed up the object identification processing, the registered images may undergo the processing in the partial feature amount extraction unit 301 in advance, and feature vectors may be saved in a separately prepared recording medium, so as to allow repetitive use. The partial feature amount extraction unit 301, which executes the aforementioned processing, will be described in detail below for respective units.

(1) Feature Vector Extraction Unit 501

The feature vector extraction unit 501 detects feature points from each object. The feature vector extraction unit 501 detects edge points of elements such as eyes, a mouth, and a nose of a face object as feature points. Note that an algorithm for detecting edge points may use, for example, a method using a convolution neural network described in Japanese Patent No. 3078166.

Subsequently, the feature vector extraction unit 501 sets a predetermined number of regions having predetermined shapes and sizes on the face object based on the relative positional relationship with the edge points detected as the feature points, and clips the set regions from the face object as partial feature regions. Assume that as reference edge points upon setting partial feature regions, points, which are selected from portions such as right and left eyes, two edge points of a mouth, and nose, which express features of a person, are used.

Then, the feature vector extraction unit 501 lays out partial feature amounts in the clipped partial feature regions in a line to extract them as a feature vector. In the following description of this specification, partial feature regions are defined as small regions set on a face object, and a feature vector is defined as a set of a plurality of partial feature amounts extracted from the partial feature regions. Note that the number of partial feature regions, and their sizes are arbitrary. In this embodiment, for example, assume that each partial feature region has a size nearly equal to that of an eye, and ten or more regions are set as the number of regions. These regions are set based on the feature vector generation data holding unit 503 (to be described later).

When, for example, luminance values are extracted as partial feature amounts which configure a feature vector, since the values of these partial feature amounts suffer large changes due to a slight illumination change, they may become partial feature amounts which are not effective in identification. Hence, it is desirable to apply arbitrary filter operations such as a Gabor filter or Local Binary Pattern (LBP) to luminance values, and then to output them as a feature vector in place of directly using the luminance values as a feature vector.

Note that the LBP is disclosed in, for example, T. Ahonen, A. Hadid, & M. Pietikäinen (2004), "Face recognition with local binary patterns", Proc. of 8th European Conference on Computer Vision, ser. Lecture Notes in Computer Science, vol. 3021. Hence, please refer to this reference for details of the LBP.

(2) Feature Vector Conversion Unit 502

The feature vector conversion unit 502 applies predetermined conversion processing to a feature vector output from the feature vector extraction unit 501. The feature vector conversion processing may adopt, for example, dimension reduction by principal component analysis (PCA), and that by independent component analysis (ICA).

Note that when the PCA is used as the feature vector conversion processing, parameters such as the number of bases (the number of dimensions to be reduced of a feature vector) and a base to be used are to be set. In place of the number of bases, a sum of eigenvalues corresponding to base vectors, that is, cumulative proportion may be used as an index. Furthermore, different parameters and conversion methods may be used for respective partial feature regions.

(3) Feature Vector Generation Data Holding Unit 503

The feature vector generation data holding unit 503 holds "data required to generate a feature vector" set in advance before execution of the object identification processing. More specifically, the feature vector generation data holding unit 503 holds partial feature regions (the number, positions, and shapes of partial feature regions) to be set on each registered image and input image, and parameters such as a conversion method and conversion matrix of a feature vector. The feature vector extraction unit 501 and feature vector conversion unit 502 acquire required parameters from the feature vector generation data holding unit 503 and execute their processing.

Figure 6:
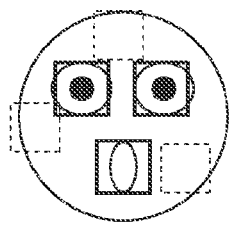
FIG. 6 is a view for explaining partial feature regions.

In this embodiment, the partial feature regions held by the feature vector generation data holding unit 503 are roughly classified into two types. FIG. 6 shows examples of the two types of partial feature regions held by the feature vector generation data holding unit 503.

As shown in FIG. 6, the partial feature regions include standard partial feature regions and adaptive partial feature regions (in other words, the feature vector extraction unit 501 serves as a first extraction means for extracting standard partial feature regions and a second extraction means for extracting adaptive partial feature regions). The standard partial feature regions are partial feature regions that are set in advance, and are always fixed independently of whether or not a new registered image is added to the registered image recording unit 102. On the other hand, the adaptive partial feature regions are partial feature regions that are sequentially re-set every time a new registered image is added to the registered image recording unit 102.

The standard partial feature regions include partial feature regions which are effective in identification among all categories independently of races, genders, and ages. Assume that the standard partial feature regions are set in the feature vector generation data holding unit 503 in an unchangeable format when the object identification apparatus 100 commences operations.

On the other hand, assume that the adaptive partial feature regions are sequentially re-set during operations of the object identification apparatus 100, so that they include partial feature regions effective in identification between two specific categories. Note that the adaptive partial feature regions are calculated by executing learning processing using registered images held in the registered image recording unit 102 as learning data. For example, in case of a face object of a person, it is desirable to set a partial feature region including a mole or scar unique to that person as an adaptive partial feature region. Note that a practical method of calculating adaptive partial feature regions will be described later.

Note that both the standard and adaptive partial feature regions typically include ten or more regions in place of one region each. For this reason, a set including a plurality of standard partial feature regions will be referred to as a standard partial feature region set, and a set including a plurality of adaptive partial feature regions will be referred to as an adaptive partial feature region set hereinafter.

Note that adaptive partial feature region sets are individually set for respective categories. That is, in this embodiment, adaptive partial feature region sets as many as the number of categories are set for objects respectively included in the input image and registered images. One adaptive partial feature region set can be divided into several subsets. Adaptive partial feature regions included in one subset include those which are effective in identification between a category for which the adaptive partial feature region set is set and any one of other categories. That is, one adaptive partial feature region set includes subsets as many as the number of other categories at a maximum.

Figure 7:
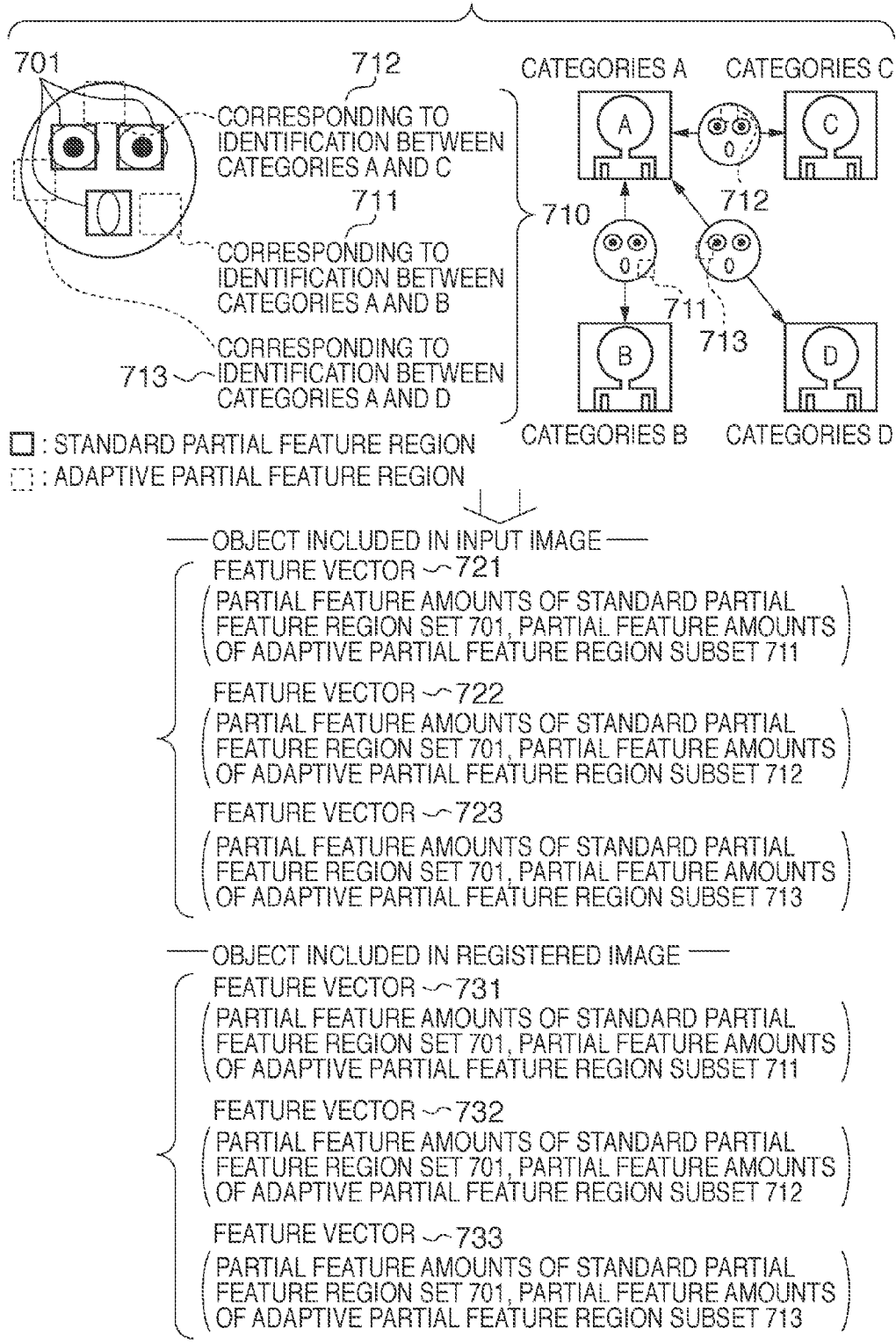
FIG. 7 is a view for explaining the relationship between adaptive partial feature regions and corresponding categories, and feature vectors.

(4) Configuration Example of Standard Partial Feature Region Set and Adaptive Partial Feature Region Set Practical configuration examples of a standard partial feature region set and adaptive partial feature region set will be described below with reference to FIG. 7. FIG. 7 shows examples of a standard partial feature region set 701 and adaptive partial feature region set 710 set for category A when there are four categories A to D.

As shown in FIG. 7, when there are categories A to D, the adaptive partial feature region set 710 includes a subset 711 including adaptive partial feature regions effective in identification between categories A and B. Furthermore, the adaptive partial feature region set 710 includes subsets 712 and 713 including adaptive partial feature regions effective in identification between categories A and C and between categories A and D (that is, the set 710 includes a total of three subsets).

Note that a combination of one of subsets included in the adaptive partial feature region set 710 and the standard partial feature region set 701 will be referred to as "expanded partial feature regions" hereinafter. More specifically, a combination of the standard partial feature region set 701 and adaptive partial feature region subset 711, and that of the standard partial feature region set 701 and adaptive partial feature region subset 712 correspond to the expanded partial feature regions. Also, a combination of the standard partial feature region set 701 and adaptive partial feature region subset 713 corresponds to the expanded partial feature regions.

Note that the partial feature amount extraction unit 301 switches an adaptive partial feature region set to be used for each category to which acquired registered images to be processed are classified at the time of the partial feature amount extraction processing. For example, a case will be described below wherein the partial feature amount extraction processing is executed for an object included in the input image and those included in registered images classified to category A to extract feature vectors. In this case, the partial feature amount extraction unit 301 extracts feature vectors 721 and 731 based on the standard partial feature region set 701 and adaptive partial feature region subset 711 corresponding to identification between categories A and B, which is included in the adaptive partial feature region set 710.

Also, the partial feature amount extraction unit 301 extracts feature vectors 722 and 732 based on the standard partial feature region set 701 and adaptive partial feature region subset 712 corresponding to identification between categories A and C, which is included in the adaptive partial feature region set 710.

Furthermore, the partial feature amount extraction unit 301 extracts feature vectors 723 and 733 based on the standard partial feature region set 701 and adaptive partial feature region subset 713 corresponding to identification between categories A and D, which is included in the adaptive partial feature region set 710.

Note that in the example of FIG. 7, three partial feature regions are illustrated as the standard partial feature region set, and three partial feature regions are illustrated as the adaptive partial feature region set for the sake of simplicity.

However, each of these partial feature region sets includes ten or more partial feature regions in practice.

<3.3 Processing Sequence in Partial Feature Amount Comparison Unit>

The partial feature amount comparison unit 302 will be described below. The partial feature amount comparison unit 302 calculates correlation values by comparing feature vectors extracted from the corresponding expanded partial feature regions between objects included in the input image and registered images. As described above, since the expanded partial feature regions include a plurality of partial feature regions, a plurality of correlation values are calculated.

Then, the partial feature amount comparison unit 302 generates a correlation value vector by bundling all the calculated correlation values. Note that various definitions are available as those of correlation values between feature vectors. In this embodiment, for example, a cosine value of an angle feature vectors make is used as a correlation value. The number of dimensions of each correlation value vector matches the number of partial feature regions included in the corresponding expanded partial feature regions.

Figure 9:
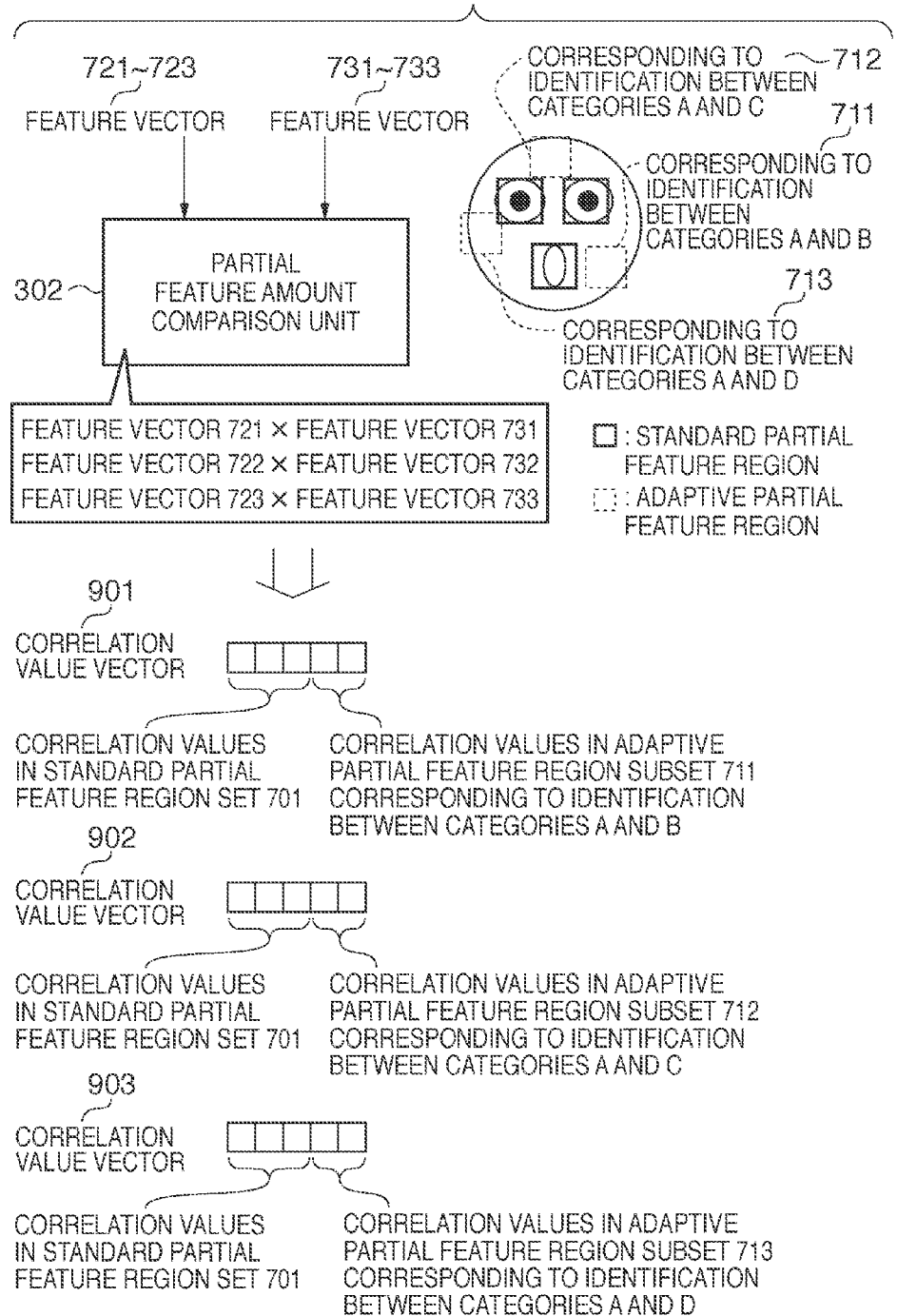
FIG. 9 is a view for explaining processing in a partial feature amount comparison unit, and the configurations of correlation value vectors.

A practical example of processing in the partial feature amount comparison unit 302 will be described below with reference to FIG. 9. FIG. 9 shows a processing example for generating correlation value vectors based on the feature vectors 721 to 723 and the feature vectors 731 to 733 in the partial feature amount comparison unit 302.

The correlation value vector includes components of correlation values (first correlation values) obtained by comparing the registered image and input image in association with respective regions in the standard partial feature region set. Furthermore, the correlation value vector includes components of correlation values (second correlation values) obtained by comparing the registered image and input image in association with respective regions in each adaptive partial feature region subset.

More specifically, as shown in FIG. 9, when there are four categories A to D, correlation values are calculated by comparing the feature vectors 721 and 731. As described above, the feature vector 721 includes partial feature amounts of the expanded partial feature regions (that is, the standard partial feature region set 701 and adaptive partial feature region subset 711) as elements. Also, the feature vector 731 includes partial feature amounts of the expanded partial feature regions (that is, the standard partial feature region set 701 and adaptive partial feature region subset 711) as elements. That is, since both the feature vectors 721 and 731 include a plurality of elements, a correlation value vector 901 generated by comparing the feature vectors 721 and 731 includes a plurality of correlation values as elements.

Likewise, a correlation value vector 902 including a plurality of correlation values is generated by comparing the feature vectors 722 and 732. Furthermore, a correlation value vector 903 including a plurality of correlation values is generated by comparing the feature vectors 723 and 733.

<3.4 Processing Sequence in Similarity Calculation Unit>

Figure 8:
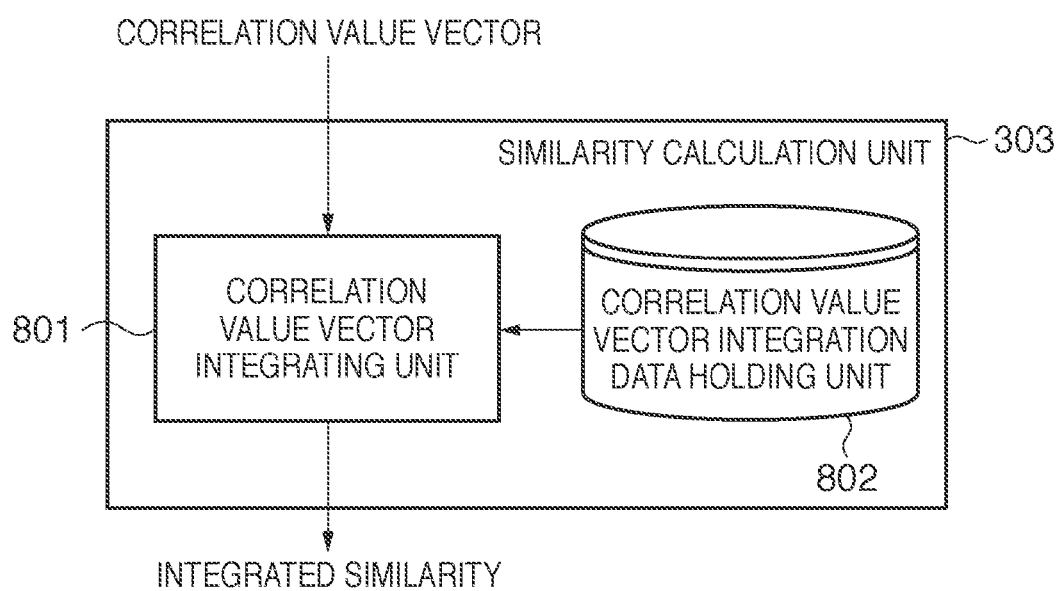
FIG. 8 is a block diagram showing the functional arrangement of a similarity calculation unit.

The similarity calculation unit 303 will be described below. FIG. 8 is a block diagram showing the functional arrangement of the similarity calculation unit 303. As shown in FIG. 8, the similarity calculation unit 303 includes a correlation value vector integrating unit 801 and correlation value vector integration data holding unit 802.

The correlation value vector integrating unit 801 calculates similarities from the correlation value vectors obtained by the partial feature amount comparison unit 302, so as to check whether or not the input image to be classified and registered images to be processed are classified into the same category. Then, the correlation value vector integrating unit 801 integrates the calculated similarities to calculate an integrated similarity.

The correlation value vector integration data holding unit 802 stores settings associated with which component of a correlation value vector corresponds to the subset or which correlation value of the standard partial feature regions is to be extracted. For this reason, the correlation value vector integrating unit 801 calculates an integrated similarity with reference to the correlation value vector integration data holding unit 802.

A practical example of the similarity calculation processing in the similarity calculation unit 303 will be described below with reference to FIG. 9. The correlation value vector integrating unit 801 extracts some correlation values corresponding to the standard partial feature region set and all correlation values corresponding to one of the adaptive partial feature region subsets from the correlation value vector. Then, the correlation value vector integrating unit 801 calculates, as a similarity, an average value of top several % relatively large correlation values (a predetermined number of correlation values in descending order) in the extracted correlation values.

In the example of FIG. 9, the correlation value vector integrating unit 801 extracts some correlation values corresponding to the standard partial feature region set 701 and all correlation values corresponding to the adaptive partial feature region subset 711 from the correlation value vector 901. Then, the correlation value vector integrating unit 801 calculates, as a similarity, an average value of top several % relatively large correlation values of the extracted correlation values. In this case, this similarity is defined as "score(A, B)".

Likewise, the correlation value vector integrating unit 801 extracts some correlation values corresponding to the standard partial feature region set 701 and all correlation values corresponding to the adaptive partial feature region subset 712 from the correlation vector 902. Then, the correlation value vector integrating unit 801 calculates, as a similarity, an average value of top several % relatively large correlation values of the extracted correlation values. In this case, this similarity is defined as "score(A, C)".

Likewise, the correlation value vector integrating unit 801 extracts some correlation values corresponding to the standard partial feature region set 701 and all correlation values corresponding to the adaptive partial feature region subset 713 from the correlation vector 903. Then, the correlation value vector integrating unit 801 calculates, as a similarity, an average value of top several % relatively large correlation values of the extracted correlation values. In this case, this similarity is defined as "score(A, D)".

The correlation value vector integrating unit 801 integrates the plurality of similarities obtained in this way to calculate an integrated similarity. Note that in this embodiment, a similarity with a minimum value of the respective similarities is adopted as an integrated similarity (score) between the registered images to be processed and the input image, and is output to the identification result integration unit 304. That is, the correlation value vector integrating unit 801 calculates an integrated similarity from "score(A, B)", "score(A, C)", and "score(A, D)", which are calculated based on the correlation values extracted from the respective correlation value vectors, by:

$$\text{Integrated similarity score} = \min(\text{score}(A,B), \text{score}(A,C), \text{score}(A,D))$$

The reason why correlation values obtained from the standard partial feature region set and adaptive partial feature region set are combined and used upon calculation of a similarity, as described above, is as follows.

As described above, the standard partial feature region set includes partial feature regions immune to variations of an appearance of an object due to changes of the photographing conditions as a result of prior learning.

On the other hand, the adaptive partial feature region set includes partial feature regions from which partial feature amounts effective to identify differences between two specific categories are extracted. For this reason, by combining these two partial feature regions, a high identification performance can be assured in identification between two specific categories while maintaining high robustness against changes of the photographing conditions.

The reason why the minimum value of the similarities is selected upon calculation of the integrated similarity is to enhance a difference between the integrated similarity calculated between images which are classified into a single category, and that calculated between images which are classified into different categories. When the image registration unit 104 (to be described later) performs learning to calculate the adaptive partial feature region set, the subset corresponding to identification between, for example, categories A and B, is learned to have the following two properties.

The first property is to obtain a high similarity upon comparison of images which are classified to category A or those which are classified to category B using the subset. The second property is to obtain a distinctly low similarity upon comparison between images classified to categories A and B.

Upon examining a case in which the registered image and input image, which are classified into category A, are to be identified according to the example of FIG. 9 based on these two properties, the following three results are expected.

As the first result, similarities "score(A, B)", "score(A, C)", and "score(A, D)" obtained from an input image to be classified into category A assume high values. For this reason, even when a minimum value is selected from these similarities, an integrated similarity assumes a sufficiently high value.

As the second result, "score(A, B)" assumes a distinctly low value, that is, a minimum value of the similarities obtained from an input image to be classified into category B.

As the third result, similarities "score(A, B)", "score(A, C)", and "score(A, D)" obtained from an input image falling outside the registered categories are not distinctly low values, but a minimum value is selected from them.

As can be seen from these three results, a difference between the integrated similarity calculated between images which are classified into an identical category and that calculated between images which are classified into different categories becomes large.

<3.6 Processing Sequence in Identification Result Integration Unit>

The identification result integration unit 304 will be described below. The identification result integration unit 304 decides a category to which the input image is to be classified from the integrated similarities which are obtained for all the registered images. More specifically, the identification result integration unit 304 compares the integrated similarities obtained for the respective registered images, and determines a category to which the registered image having the largest integrated similarity is classified as that to which the input image is to be classified.

In this case, a category is determined under the condition that the integrated similarity is equal to or larger than a predetermined threshold. When the largest integrated similarity does not exceed the predetermined threshold, a classification result indicating that there is no category to which the input image is to be classified is output.

Note that the magnitude of the predetermined threshold is arbitrary. However, when the predetermined threshold is too large, it is determined that many input images are not classified into any categories. On the other hand, when the predetermined threshold is too small, it is determined that an input image which is not to be classified into any category is classified into a certain category. For this reason, the predetermined threshold should be decided via required adjustment processes, and the user can arbitrarily change the setting of the predetermined threshold.

<4. Image Registration Unit>
<4.1 Functional Arrangement and Processing Sequence of Image Registration Unit>

The functional arrangement of the image registration unit 104 will be described below. FIG. 10 is a block diagram showing the functional arrangement of the image registration unit 104. As shown in FIG. 10, the image registration unit 104 includes a registered image updating unit 1001, registered image information acquisition unit 1002, registered image evaluation unit 1003, feature vector generation data updating unit 1004, and correlation value vector integration data updating unit 1005.

The registered image updating unit 1001 records a new registered image, deletes an already held registered image, and replaces registered images in the registered image recording unit 102.

The registered image information acquisition unit 1002 extracts and calculates various kinds of information about the registered images held in the registered image recording unit 102.

The registered image evaluation unit 1003 checks based on various kinds of information acquired by the registered image information acquisition unit 1002 whether or not the adaptive partial feature region sets are required to be updated.

The feature vector generation data updating unit 1004 and correlation value vector integration data updating unit 1005 select an adaptive partial feature region set using various kinds of information acquired by the registered image information acquisition unit 1002. Then, the feature vector generation data updating unit 1004 and correlation value vector integration data updating unit 1005 update the contents of the feature vector generation data holding unit 503 in the partial feature amount extraction unit 301 and the contents of the correlation value vector integration data holding unit 802 in the similarity calculation unit 303.

Figure 11:
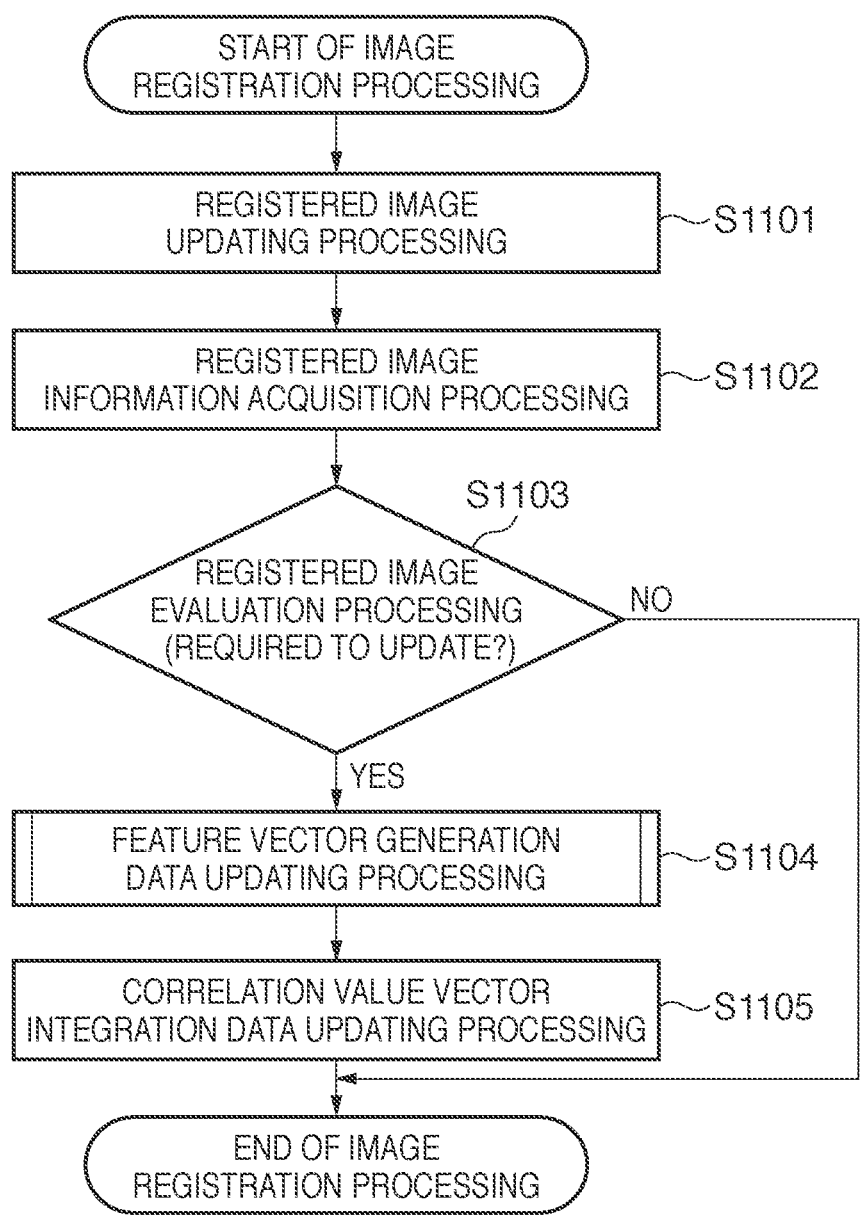
FIG. 11 is a flowchart showing the sequence of image registration processing by the image registration unit.

The sequence of the image registration processing in the image registration unit 104 will be described below. FIG. 11 is a flowchart showing the sequence of the image registration processing executed by the image registration unit 104.

In step S1101, the registered image updating unit 1001 records a registered image acquired by the image input unit 101 in the registered image recording unit 102. Alternatively, the registered image updating unit 1001 replaces a registered image already held in the registered image recording unit 102. Alternatively, the registered image updating unit 1001 deletes a registered image already held in the registered image recording unit 102 based on a user instruction.

In step S1102, the registered image information acquisition unit 1002 acquires various kinds of information such as dates and times of photographing and image resolutions from all registered images held in the registered image recording unit 102.

The registered image evaluation unit 1003 checks in step S1103 using the pieces of information acquired in step S1102 whether or not the adaptive partial feature region sets are required to be updated. If the registered image evaluation unit 1003 determines in step S1103 that the adaptive partial feature region sets are required to be updated, the process advances to step S1104.

In step S1104, the feature vector generation data updating unit 1004 selects adaptive partial feature region sets, and updates the contents of the feature vector generation data holding unit 503 based on the selection result.

In step S1105, the correlation value vector integration data updating unit 1005 selects adaptive partial feature region sets, and updates the contents of the correlation value vector integration data holding unit 802 based on the selection result.

If the registered image evaluation unit 1003 determines in step S1103 that the adaptive partial feature region sets are not required to be updated, the image registration processing ends.

Note that the image registration processing in the image registration unit 104 may be executed every time the registered image recording unit 102 is updated, or when a predetermined number or more of registered images are updated. Alternatively, the image registration processing may be executed every time the object identification apparatus 100 is activated.

<4.2 Processing Sequence in Registered Image Information Acquisition Unit>

The processes of the respective units which configure the image registration unit 104 will be described below. Details of the processing in the registered image information acquisition unit 1002 in the image registration unit 104 will be described first.

The registered image information acquisition unit 1002 extracts and calculates information for each of the registered images held in the registered image recording unit 102. Note that the information to be acquired by the registered image information acquisition unit 1002 can be roughly classified into three types. More specifically, the information to be acquired includes information about a registered image alone, statistical information about registered images for each category, and statistical information about all registered images. Respective pieces of information will be described in detail below.

The information about a registered image alone includes, for example, an elapsed time from a photographing time of an image held as a registered image, and its image resolution. These pieces of information can be acquired from EXIF information when a registered image is photographed by a digital camera.

Furthermore, the information about a registered image alone includes information obtained by applying predetermined processing to the registered image. More specifically, a classification result (an identifier of a category) obtained by applying identification processing to that registered image without using any adaptive partial feature region set (that is, in an initial state before sequential learning) is included. Also, by calculating a difference between this classification result and an identifier of a category assigned to the registered image at the time of the registered image updating processing in the registered image updating unit 1001, a reliability upon execution of identification processing using only the standard partial feature region set can be obtained. The reliability obtained in this case is also included in the information about the registered image alone.

Moreover, when the feature vector extraction unit 501 executes edge point detection processing for the registered image, likelihoods of respective edge points are obtained. More specifically, reciprocals of differences of edge point positions obtained using a plurality of edge point detection methods such as a method using a convolution neural network can be acquired as likelihoods of the edge point detection. The likelihoods acquired in this case are also included in the information about the registered image alone. Note that arbitrary edge point detection methods may be used, and known methods are used.

On the other hand, the statistical information about registered images for each category includes the number of registered images classified into that category, and information obtained as a result of statistical processing of pieces of information about registered images alone for each category. For example, an average or maximum value of elapsed times from the photographing times for each category is included.

The statistical information about all registered images includes the number of all registered images, and information obtained as a result of statistical processing of pieces of information about registered images alone for all the registered images. For example, an average or maximum value of elapsed times from the photographing times for all the registered images is included.

Note that of the pieces of information acquired by the registered image information acquisition unit 1002, the information about a registered image alone may be recorded in, for example, a separately prepared recording medium.

<4.3 Processing Sequence in Registered Image Evaluation Unit>

Details of the processing in the registered image evaluation unit 1003 will be described below. The registered image evaluation unit 1003 judges based on the information acquired by the registered image information acquisition unit 1002 whether or not to update the adaptive partial feature region sets and whether or not the number of adaptive partial feature regions is appropriate. Furthermore, the registered image evaluation unit 1003 outputs the judgment result to the feature vector generation data updating unit 1004.

Examples of criteria of judgment (first to third criteria of judgment) as to whether or not to update the adaptive partial feature region sets will be described below.

In case of the first criterion of judgment, when registered images of a new category are recorded in the object identification apparatus 100, the adaptive partial feature region sets are updated unconditionally. At this time, the existing adaptive partial feature region subsets are not updated. Also, only adaptive partial feature region subsets required for identification between the existing categories and the newly added category are calculated by executing feature vector generation data updating processing to be described later, and are added to the adaptive partial feature region sets of the respective categories.

In the second criterion of judgment, whether or not to update the adaptive partial feature region sets is judged based on collection histories of registered images, that is, dates and times of photographing of registered images. Depending on a nature of an object to be identified, an outer appearance often changes as an elapse of time. In this case, an adaptive partial feature region set selected based on registered images acquired at a certain timing is unlikely to contribute to correct identification. Hence, when elapsed times from the dates and times of photographing of already held registered images are equal to or larger than a predetermined value (that is, when a predetermined time has elapsed), it is determined that the contents of the feature vector generation data holding unit 503 are required to be updated.

More specifically, when an occupation ratio of registered images, the number of days elapsed after photographing of which exceeds the predetermined number of days becomes equal to or larger than a predetermined value with respect to the total number of registered images, the contents of the feature vector generation data holding unit 503 are updated for registered images photographed the predetermined number of days before. Note that when the elapsed times from the photographing times are short, and the number of target registered images is equal to or smaller than a predetermined value, the updating processing of the contents of the feature vector generation data holding unit 503 may be skipped.

Based on the third criterion of judgment, whether or not to update the adaptive partial feature region sets is judged based on the number of registered images. More specifically, when a predetermined number or more of images are added after the adaptive partial feature region sets were learned based on the registered images preciously until the present time, it is determined that the contents of the feature vector generation data holding unit 503 are required to be updated. Since the registered images are added, it is expected that variations more than before are included in photographing conditions of objects included in the registered images. By executing learning based on a plurality of registered images including various photographing conditions, adaptive partial feature region sets which are robust against variations of the photographing conditions and are more effective in identification between categories can be obtained.

Criteria (first and second criteria) used to decide the number of regions included in each adaptive partial feature region subset will be described below.

Based on the first criterion, the number of regions included in each adaptive partial feature region subset is judged based on the number of registered images classified into two categories corresponding to that subset. In the feature vector generation data updating processing to be described later, in order to learn a certain subset, registered images classified into two categories corresponding to that subset are used as learning data. At this time, when the number of registered images is smaller than the predetermined number of images, it is determined that the learning result is not reliable, and the subset is not formed, that is, the number of regions in that subset is set to be zero.

Based on the second criterion, the number of regions included in each adaptive partial feature region subset is judged based on similarities between two categories corresponding to that subset. When two categories correspond to a parent and child or brothers, the number of adaptive partial feature regions is desirably increased since they are particularly similar to each other. On the other hand, when two categories corresponding to a subset correspond to others, the number of adaptive partial feature regions is desirably decreased to reduce the load on the object identification processing, since they are not similar to each other.

Figure 12:
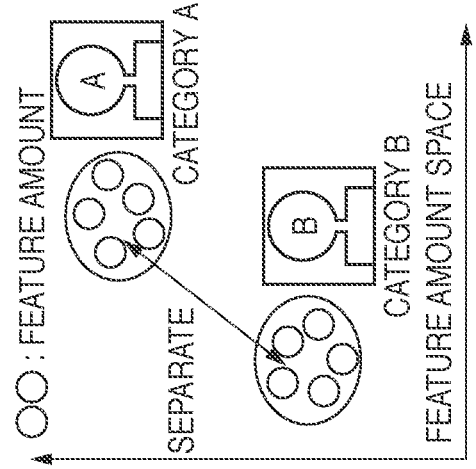
FIG. 12 is a view showing distributions of partial feature amounts of two categories on a predetermined feature amount space.

Note that a similarity between categories can be measured based on, for example, Fisher discriminant analysis shown in FIG. 12. FIG. 12 shows the distributions of partial feature amounts obtained from a certain partial feature region of registered images classified into arbitrary two categories A and B on a feature amount space. Hence, by measuring a degree of separation "separation(A, B)" indicating a degree of separation of the partial feature amounts on the feature amount space using FIG. 12, a similarity between two categories A and B can be measured.

A reciprocal of an average value obtained by calculating and averaging degrees of separation, which can be measured in this way, for all the regions in the standard partial feature region set is defined as a similarity "similarity(A, B)" between categories. This similarity becomes large between similar categories such as a parent and child or brothers, and becomes small between categories such as others.

Then, the similarity is compared with a predetermined reference value "similarity'", the numbers "number(A, B)" of adaptive partial feature regions included in a subset corresponding to two categories A and B is increased or decreased from a prescribed initial value "number'".

$$number(A,B)=number'\times(similarity(A,B)/similarity')$$

<4.4 Processing Sequence in Feature Vector Generation Data Updating Unit>

Details of the processing in the feature vector generation data updating unit 1004 will be described below. The feature vector generation data updating unit 1004 generates adaptive partial feature region sets dedicated to respective categories using the registered images held in the registered image recording unit 102 and the information acquired by the registered image information acquisition unit 1002. The feature vector generation data updating unit 1004 sets the generated adaptive partial feature region sets in the feature vector generation data holding unit 503 in the partial feature amount extraction unit 301.

Processing for generating an adaptive partial feature region set dedicated to category A when there are four categories A to D will be described below according to the above example shown in FIG. 7. As described above, the adaptive partial feature region set includes some subsets. The adaptive partial feature region set includes a subset including adaptive partial feature regions that can identify images classified to categories A and B in case of four categories A to D. Furthermore, the adaptive partial feature region set includes subsets including adaptive partial feature regions which can identify images classified to categories A and C, and those classified to categories A and D. A practical method of generating the subset corresponding to identification between categories A and B will be described below.

Upon calculating adaptive partial feature regions which form a subset, typically several hundred to several thousand partial feature region candidates which are prepared in advance are evaluated using one or more registered images classified into categories A and B. Of these region candidates, typically ten or more partial feature region candidates which are evaluated to be particularly effective in identification between images classified into categories A and B are extracted to form a subset corresponding to identification between categories A and B.

An adaptive partial feature region set which can identify registered images classified into two categories includes partial feature regions having small variations due to photographing conditions (typically, face directions, face expressions, illumination states, makeup, etc. in case of a face image) between registered images classified into a single category. In addition, such adaptive partial feature region set includes partial feature regions which are not similar to each other between registered images classified into two categories.

When the object identification processing is executed using such partial feature regions, a higher similarity can be obtained upon identifying registered images classified into a single category, and a lower similarity can be obtained upon identifying registered images classified into two categories. Hence, a higher identification performance can be expected.

Arbitrary criteria and algorithms of selecting adaptive partial feature region candidates having such properties can be used. An example of such criterion and algorithm will be described below.

Figure 13:
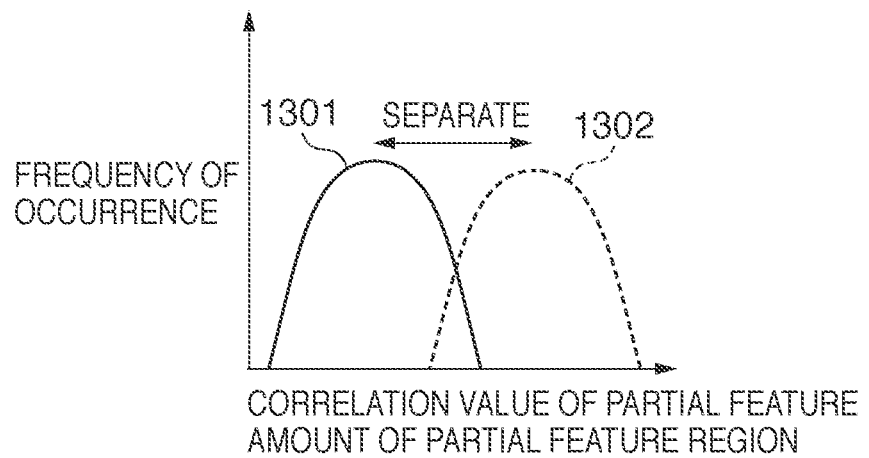
FIG. 13 is a graph showing histograms of respective correlation values when correlation values between registered images, which are classified into a single category, and correlation values between registered images, which are classified into different categories, are calculated using partial feature amounts of specific adaptive partial feature regions.

As one criterion for selecting adaptive partial feature region candidates, a degree of separation between a correlation value histogram upon comparing registered images classified into a single category and that upon comparing registered images classified into two categories may be used. FIG. 13 shows the concept of such histograms.

Adaptive partial feature regions are more effective as two distributions shown in FIG. 13 are separated farther away from each other. A method of selecting effective partial feature regions using one boosting algorithm called an AdaBoost Method will be described below. Since a detailed description of the AdaBoost method is described in reference [Viola & Jones (2001) "Rapid Object Detection using a Boosted Cascade of Simple Features", Computer Vision and Pattern Recognition.], only an overview will be explained below.

The boosting algorithm is one of machine learning methods, which builds up a strong discriminator having a sufficient identification performance by combining a plurality of weak discriminators, each of which does not have any sufficient identification performance. Typically, one combination of a partial feature region and feature vector conversion method corresponds to a weak discriminator, and execution of identification processing using a plurality of partial feature regions is equivalent to identification using the strong discriminator.

Figure 14:
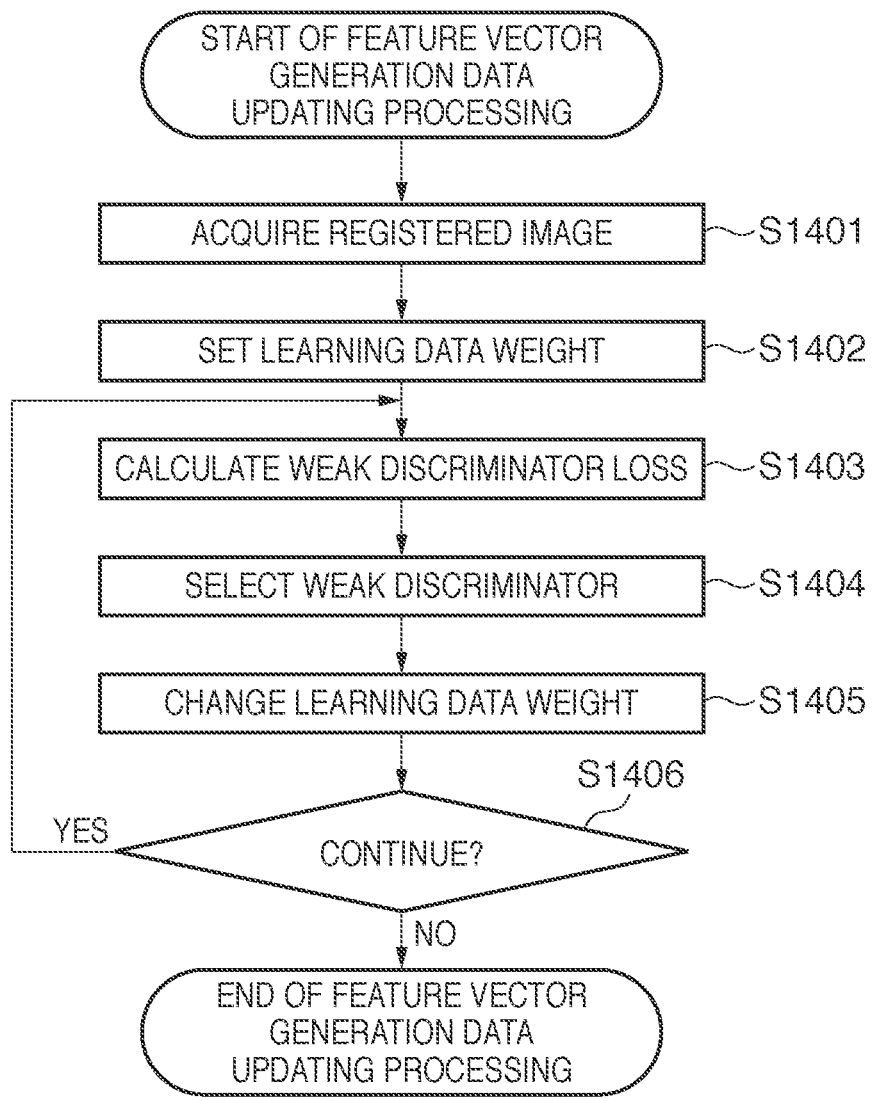
FIG. 14 is a flowchart showing the sequence of feature vector generation data updating processing in a feature vector generation data updating unit.

The sequence of learning in the AdaBoost method will be described below with reference to FIG. 14. In step S1401, registered images as learning data are acquired. In step S1402, weights are respectively assigned to the registered images as learning data. In step S1403, a loss for learning data is calculated for each weak discriminator. The loss is a sum total of weights of learning data which cannot be correctly identified by that weak discriminator.

In step S1404, one weak discriminator having a smallest loss is selected. In step S1405, weights of learning data which cannot be correctly identified by that weak discriminator are increased.

Under the condition in which the weights are changed, processing for calculating losses of weak discriminators again, and selecting a weak discriminator having the smallest loss is repeated.

It is determined in step S1406 whether or not the processing is repeated the predetermined number of times. If it is determined that the processing is repeated the predetermined number of times, the processing ends. In this way, an arbitrary number of weak discriminators are obtained.

In the object identification apparatus 100, one combination of two registered images corresponds to one learning data, and one partial feature candidate corresponds to one weak discriminator. When weak discriminators obtain correlation values in adaptive partial feature region candidates for all learning data, correlation value histograms shown in FIG. 13 are calculated. Then, after a correlation value at an intersecting position between histograms 1301 and 1302 is set as a threshold, if a correlation value between two registered image is higher than the threshold, learning data is classified into "single category"; otherwise, it is classified into "different categories".

Since the sum total of the weights of the learning data which cannot be identified is the loss of a weak discriminator, that loss is equal to a value obtained by weighting an area of a region of the histogram 1301 on the right side of the threshold and that of a region of the histogram 1302 on the left side of the threshold by the learning data. That is, adaptive partial feature region candidates corresponding to two histograms which are separated farther away from each other are consequently preferentially selected.

As a result of execution of the AdaBoost method, top ten or more adaptive partial feature region candidates selected from typically hundred to thousand adaptive partial feature region candidates are selected as those effective in identification.

On the other hand, some lowest-ranked adaptive partial feature region candidates to be selected from the adaptive partial feature region candidates are partial feature regions which are not suited to identification. When these lower-ranked adaptive partial feature region candidates overlap standard partial feature regions, the settings of the feature vector generation data holding unit 503 are changed to calculate similarities without using those standard partial feature regions.

With the above processing, expanded partial feature regions as a combination of the adaptive partial feature region set and standard partial feature region set corresponding to category A are generated. Likewise, expanded partial feature regions corresponding to category B are generated. At this time, a subset corresponding to identification between categories B and A in the adaptive partial feature region set has the same identification targets and the same learning data as the aforementioned subset corresponding to identification between categories A and B. Hence, equal subsets are obtained. Therefore, learning for the latter subset may be omitted, and the learning result of the former subset may be commonly used.

Using a sufficient number of registered images including various photographing conditions as learning data, an adaptive partial feature region set which is robust against the influence of photographing conditions and is effective in identification between images classified into two categories can be selected.

However, in initial operations of the object identification apparatus 100 and depending on its operation conditions, a sufficient number of registered images cannot be obtained. For this reason, for example, by generating images by varying registered images, the number of registered images used as learning data may be increased.

Practical variations include, for example, addition of noise, and image processes such as rotation using models of objects. Note that the variation image generation method is disclosed in a known reference, and a description thereof will not be given.

Furthermore, when some machine learning methods such as the aforementioned AdaBoost method are used, a calculation load becomes heavy. For this reason, it becomes often difficult to execute processing in the object identification apparatus depending on the calculation performance of the object identification apparatus and the power supply specifications. Hence, for example, by narrowing down the number of adaptive partial feature region candidates in advance, the required calculation volume in the object identification apparatus may be reduced, thus lightening the processing load. Furthermore, upon selection of the adaptive partial feature region set, adaptive partial feature region candidates themselves may be selected in advance using, for example, the AdaBoost method outside the object identification apparatus to reduce the number of candidates.

Note that when the standard partial feature region set is selected in advance, the AdaBoost method introduced in this embodiment can be used. Upon selection of the standard partial feature region set, image data in large quantities, which are prepared in advance, can be used as learning data in place of registered images. The learning data desirably include various categories (races, genders, ages, etc. in case of face images) and photographing conditions (face directions, face expressions, illumination conditions, etc. in case of face images).

Using such learning data, it is expected to obtain the standard partial feature region set which can realize a given identification performance irrespective of categories and photographing conditions. However, since the AdaBoost method using learning data in large quantities requires a large calculation volume, the learning is desirably performed outside the object identification apparatus 100.

<4.5 Processing Sequence in Correlation Value Vector Integration Data Updating Unit>

The correlation value vector integration data updating unit 1005 will be described below. The correlation value vector integration data updating unit 1005 sets information required for integration of feature vectors in the correlation value vector integration data holding unit 802 in the similarity calculation unit 303 based on the adaptive partial feature region sets learned by the feature vector generation data updating unit 1004.

More specifically, the correlation value vector integration data updating unit 1005 sets information indicating which of adaptive partial feature region subset or the standard partial feature region set each component of a correlation value vector obtained from the partial feature amount comparison unit 302 corresponds to. Also, the correlation value vector integration data updating unit 1005 sets information indicating which correlation values corresponding to the standard partial feature region set are not used in calculations of similarities.

As can be seen from the above description, the object identification apparatus according to this embodiment is configured to extract a standard partial feature region set effective to identification between images classified into a plurality of categories. Furthermore, the object identification apparatus is configured to extract an adaptive partial feature region set effective to identification between images classified to two specific categories. Then, the object identification apparatus is configured to calculate correlation values between an input image and registered images using the extracted standard partial feature region set and adaptive partial feature region set, thus calculating similarities between the input image and registered images.

As a result, a high identification performance can be realized in identification between two specific categories while maintaining high robustness against changes of photographing conditions.

[Second Embodiment]

In the first embodiment, an adaptive partial feature region set is selected based on registered images using the AdaBoost method with reference to a degree of separation of correlation value histograms of partial feature amounts in a given partial feature region. However, the present invention is not limited to this. For example, the adaptive partial feature region set may be selected with reference to a degree of separation of feature vector distributions including partial feature amounts in a given partial feature region between categories.

Processing for selecting an adaptive partial feature region set in the object identification apparatus according to this embodiment will be practically described below. In the following description, a description redundant to that in the first embodiment will be avoided. Also, the functions of respective units which are not described in this embodiment are the same as those in the first embodiment. Hence, please refer to the description of the first embodiment for the functions of the respective units.

<Processing Sequence in Feature Vector Generation Data Updating Unit>

Differences from the first embodiment will be described below in association with a feature vector generation data updating unit 1004 in an image registration unit 104. In the first embodiment, adaptive partial feature region sets are generated based on registered images using the AdaBoost method with reference to a degree of separation between correlation value histograms of partial feature amounts in a given partial feature region.

By contrast, in this embodiment, adaptive partial feature region subsets are generated by a method to be described below. Note that a case will be described below wherein an adaptive partial feature region set dedicated to category A is generated when there are four categories A to D.

As described above, an adaptive partial feature region set which can identify images classified into two categories includes partial feature regions having small variations due to photographing conditions between registered images classified into a single category. In addition, the adaptive partial feature region set includes partial feature regions which are not similar to each other between registered images classified into two categories. This is because when object identification processing is executed using such partial feature regions, a higher similarity can be calculated between registered images classified into a single category, and a lower similarity can be calculated between registered images classified into two categories.

On the other hand, in this embodiment, a degree of separation of partial feature amounts obtained from registered images classified into two categories on a feature amount space is evaluated. More specifically, the degree of separation is evaluated according to criteria of Fisher discriminant analysis shown in FIG. 12.

These criteria are the same as those used in a registered image evaluation unit 1003 of the first embodiment. According to an equation shown in FIG. 12, a degree of separation of partial feature amounts obtained from a certain partial feature region becomes larger with decreasing variances of distributions between partial feature amounts of identical categories and with increasing variances of distributions between those of categories A and B. This property matches that of a partial feature region effective in identification described above.

Upon generation of a subset, this degree of separation "separation(A, B)" is calculated for each of adaptive partial feature region candidates. Then, an arbitrary number of partial feature regions are extracted in turn from those having relatively high degrees of separation to generate a subset corresponding to identification between categories A and B. Note that as in the first embodiment, the settings of a feature vector generation data holding unit 503 are changed to calculate similarities without using standard partial feature regions, which overlap lower-ranked partial feature regions having lower degrees of separation.

When a degree of separation between correlation value histograms described in the first embodiment is used as a criterion, an inter-category difference is indirectly observed by temporarily converting learning data into correlation values. By contrast, in case of this embodiment, by checking partial feature amount distributions on the feature amount space, an inter-category difference can be directly observed. Since the need for iterative loss calculations for respective partial feature regions can be obviated unlike in the AdaBoost method, a learning load is relatively light.

[Third Embodiment]

In the first embodiment, upon calculating an integrated similarity by integrating similarities, an integrated similarity is calculated by integrating similarities which are calculated respectively using a standard partial feature region set and adaptive partial feature region set. However, the present invention is not limited to this. For example, similarities obtained by integrating correlation values calculated using only the standard partial feature region set may be used in integration of similarities.

Details of this embodiment will be described below. As in the second embodiment, in order to avoid a repetitive description, a description redundant to that in the first or second embodiment will not be given. Also, the functions of respective units which are not described in the following description of this embodiment are the same as those in the first embodiment. Hence, please refer to the description of the first embodiment for the functions of the respective units.

<Processing Sequence in Similarity Calculation Unit>

Differences from the first embodiment will be described below in association with a similarity calculation unit 303 in an object identification unit 103. In the first embodiment, some correlation values corresponding to a standard partial feature region set are integrated with all correlation values corresponding to one adaptive partial feature region subset, thus calculating a similarity. Also, similarities as many as the number of adaptive partial feature region subsets are calculated. More specifically, three similarities "score(A, B)", "score(A, C)", and "score(A, D)" are calculated. Then, a minimum value of the obtained similarities is output as an integrated similarity "score" between registered images and an input image to an identification result integration unit 304.

However, in case of the integration method described in the first embodiment, when an image including an object other than already registered categories is input as an input image, an over-training problem may occur. Note that over-training is generally a phenomenon in which an identifier causes over-fitting to a small number of learning data in a machine learning method that learns using the identifier based on the learning data.

When over-training has occurred, the identifier is specialized to the learning data, and its identification performance can no longer be guaranteed for an input image of a property which is not included in the learning data. In case of an object identification apparatus 100, an input image including an object other than already registered categories does not match any learning data in all adaptive partial feature region sets.

For this reason, similarities obtained by integrating the adaptive partial feature region subsets are likely to assume unexpectedly high values. If all similarities assume unexpectedly high values, an expected integrated similarity cannot be obtained even by adopting a minimum value from these similarities.

Hence, in this embodiment, a similarity "score(standard)" using only correlation values corresponding to the standard partial feature region set is also calculated. The standard partial feature region set has been learned to be able to identify objects irrespective of whether or not they are registered. For this reason, even when an image including an object other than the registered categories is input, "score(standard)" is unlikely to assume an unexpectedly high value.

Then, in this embodiment, the similarity calculated in this way and the three similarities calculated in the first embodiment are combined, and a minimum value is selected from these similarities as an integrated similarity (see an equation below).

score=argmin(score(standard), score($A,B$), score($A,C$), score($A,D$))

With this processing, even when all the three similarities using the adaptive partial feature region subsets assume unexpected values due to an over-training problem, a high identification performance can be maintained.

Note that the similarity "score(standard)" is calculated by calculating an average value of top several % correlation values of the correlation values corresponding to the standard partial feature region set as in the first embodiment.

[Fourth Embodiment]

In the first embodiment, when a high similarity is obtained, it is determined that a registered image and input image are likely to be classified into a single category. However, the present invention is not limited to this. For example, as a lower similarity is obtained, it may be determined that a registered image and input image are likely to be classified into different categories. Details of this embodiment will be described below.

As in the third embodiment, in order to avoid a repetitive description, a description redundant to that in the first to third embodiments will not be given. Also, a description of the functions of respective units which are not described in this embodiment is the same as that in the first embodiment. Hence, please refer to the first embodiment for the description of the functions of the respective units.

<Processing Sequence in Partial Feature Amount Comparison Unit>

Differences from the first embodiment will be described below in association with processing in a partial feature amount comparison unit 302. As described in the first embodiment, the partial feature amount comparison unit 302 calculates correlation values by comparing feature vectors extracted from corresponding expanded partial feature regions between an input image and registered images. Then, all correlation values are bundled to generate a correlation value vector.

At this time, in the first embodiment, a cosine value of an angle feature vectors of a registered image and input image make is used as a similarity. However, in this embodiment, the angle itself is used as a similarity.

<Processing Sequence in Similarity Calculation Unit>

Differences from the first embodiment will be described below in association with processing in a similarity calculation unit 303. As described in the first embodiment, the similarity calculation unit 303 extracts some correlation values corresponding to a standard partial feature region set and all correlation values corresponding to one adaptive partial feature region subset from a correlation value vector upon calculation of a similarity. Then, an average value of top several % relatively large correlation values of the extracted correlation values is set as a similarity. By contrast, in this embodiment, an average value of lower-ranked several % relatively small correlation values of the extracted correlation values is set as a similarity.

In the first embodiment, upon integrating obtained similarities, a minimum value is adopted. By contrast, in this embodiment, upon integrating obtained similarities, a maximum value is adopted. This processing will be described below with reference to FIG. 9 as in the first embodiment.

As in the first embodiment, similarities "score(A, B)", "score(A, C)", and "score(A, D)" are obtained based on three expanded partial feature regions. Then, a maximum value of the obtained similarities is output to an identification result integration unit 304 as an integrated similarity "score" between registered images and an input image (see an equation below).

score=argmax(score($A,B$), score($A,C$), score($A,D$))

In the first embodiment, since a minimum value of the obtained similarities is output as an integrated similarity, an output value assumes a lowest value when registered images and an input image are classified into different categories. By contrast, in case of this embodiment, since a maximum value of the obtained similarities is output as an integrated similarity, an output value assumes a highest value when registered images and an input image are classified into different categories.

[Other Embodiments]

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-251357 filed Oct. 30, 2009, which is hereby incorporated by reference herein in its entirety.

What is claimed is:

1. An apparatus for classifying an input image, comprising: at least a processor and memory coupled to each other and cooperating to serve as:
a recording unit configured to record a plurality of registered images which are classified into a plurality of categories based on attributes of objects included in respective ones of the registered images;
a first extraction unit configured to extract, from standard partial feature regions in objects, feature amounts required to classify a plurality of images including the objects into the plurality of categories, wherein the standard partial feature regions are commonly defined for all of the plurality of categories;
a second extraction unit configured to extract feature amounts, from adaptive partial feature regions in objects in images, wherein the adaptive partial feature regions are defined for each pair of any two categories among the plurality of categories, respectively, and the adaptive partial feature regions corresponding to a pair of two specified categories among the plurality of categories are used to extract the feature amounts required to classify an image belonging to any one of the two specified categories into one of the two specified categories;
a correlation value calculation unit configured to respectively calculate first correlation values which represent correlations between feature amounts extracted from the standard partial feature regions in the input image, and feature amounts extracted from the standard partial feature regions in a registered image to be processed using said first extraction unit, and second correlation values which represent correlations between feature amounts extracted from the adaptive partial feature regions in the input image and feature amounts extracted from the adaptive partial feature regions in the registered image to be processed using said second extraction unit;
a similarity calculation unit configured to calculate a plurality of similarities between the registered image to be processed and the input image based on the first correlation values and the second correlation values calculated by said correlation value calculation unit in correspondence with respective categories of the plurality of categories except for the category to which the registered image to be processed is classified; and
an output unit configured to output an integrated similarity between the input image and the registered image to be processed by integrating the plurality of similarities calculated in correspondence with respective categories except for the category to which the registered image to be processed is classified.

2. The apparatus according to claim 1, wherein said second extraction unit extracts the adaptive partial feature regions by an AdaBoost method using registered images classified into the two specified categories as learning data.

3. The apparatus according to claim 1, wherein said second extraction unit extracts the adaptive partial feature regions from registered images classified into the two specified categories so that a variance of feature amounts extracted from registered images classified into a single category is small, and a variance of feature amounts extracted from registered images classified into the two specified categories is large.

4. The apparatus according to claim 1, wherein when a new registered image is recorded in said recording unit, the predetermined regions in the objects are changed.

5. The apparatus according to claim 1, wherein when an occupation ratio of registered images whose elapsed times since their generation of the registered images are not less than a predetermined value becomes not less than a predetermined ratio in said recording unit, the predetermined regions in the objects are changed.

6. The apparatus according to claim 1, wherein when the number of new registered images recorded since the adaptive partial feature regions to be extracted were changed previously in said recording unit becomes not less than a predetermined number, the predetermined regions in the objects are changed.

7. The apparatus according to claim 1, wherein said similarity calculation unit calculates the similarity by extracting a predetermined number of correlation values in descending order of value of a plurality of correlation values calculated as the first correlation values and the second correlation values, and calculating an average value of the extracted correlation values.

8. The apparatus according to claim 7, wherein said output unit outputs a minimum similarity of the plurality of similarities calculated by said similarity calculation unit as the integrated similarity between the input image and the registered images to be processed.

9. The apparatus according to claim 1, wherein said first extraction unit extracts the standard partial feature regions by an AdaBoost method using registered images recorded in said recording unit as learning data.

10. A method in apparatus for classifying an input image, the apparatus comprising a recording unit configured to record a plurality of registered images which are classified into a plurality of categories based on attributes of objects included in respective ones of the registered images, the method comprising:
a first extraction step of extracting, from standard partial feature regions in objects, feature amounts required to classify a plurality of images including the objects into the plurality of categories, wherein the standard partial feature regions are commonly defined for all of the plurality of categories;

a second extraction step of extracting feature amounts, from adaptive partial feature regions in objects in images, wherein the adaptive partial feature regions are defined for each pair of any two categories among the plurality of categories, respectively, and the adaptive partial feature regions corresponding to a pair of two specified categories among the plurality of categories are used to extract the feature amounts required to classify an image belonging to any one of the two specified categories into one of the two specified categories;

a correlation value calculation step of respectively calculating first correlation values which represent correlations between feature amounts extracted from the standard partial feature regions in the input image, and feature amounts extracted from the standard partial feature regions in a registered image to be processed in said first extraction step, and second correlation values which represent correlations between feature amounts extracted from the adaptive partial feature regions in the input image and feature amounts extracted from the adaptive partial feature regions in the registered image to be processed in said second extraction step;

a similarity calculation step of calculating a plurality of similarities between the registered image to be processed and the input image based on the first correlation values and the second correlation values calculated in said correlation value calculation step in correspondence with respective categories of the plurality of categories except for the category to which the registered image to be processed is classified; and an output step of outputting an integrated similarity between the input image and the registered image to be processed by integrating the plurality of similarities calculated in correspondence with respective categories except for the category to which the registered image to be processed is classified.

11. A non-transitory computer-readable storage medium for storing a program for controlling a computer to execute respective steps of an object identification method according to claim 10.

* * * * *